No. 884,602. PATENTED APR. 14, 1908.
G. MOSMEIER.
DRAFT EQUALIZER.
APPLICATION FILED AUG. 3, 1907.

Witnesses
Ray White
Harry R. L. White

Inventor
George Mosmeier,
By Kummler & Kummler,
Attys

UNITED STATES PATENT OFFICE.

GEORGE MOSMEIER, OF APACHE, OKLAHOMA.

DRAFT-EQUALIZER.

No. 884,602.

Specification of Letters Patent.

Patented April 14, 1908.

Application filed August 2, 1907. Serial No. 386,909.

*To all whom it may concern:*

Be it known that I, GEORGE MOSMEIER, a citizen of the United States of America, and a resident of Apache, Caddo county, Oklahoma, have invented certain new and useful Improvements in Draft-Equalizers, of which the following is a specification.

The main object of this invention is to provide an improved form of draft equalizer, which is simple and inexpensive in structure and which may be readily adjusted to suit a large number of different conditions for equalizing the draft of two or more horses of different relative power. This object is accomplished by the device shown in the accompanying drawing, in which:—

Figure 1:
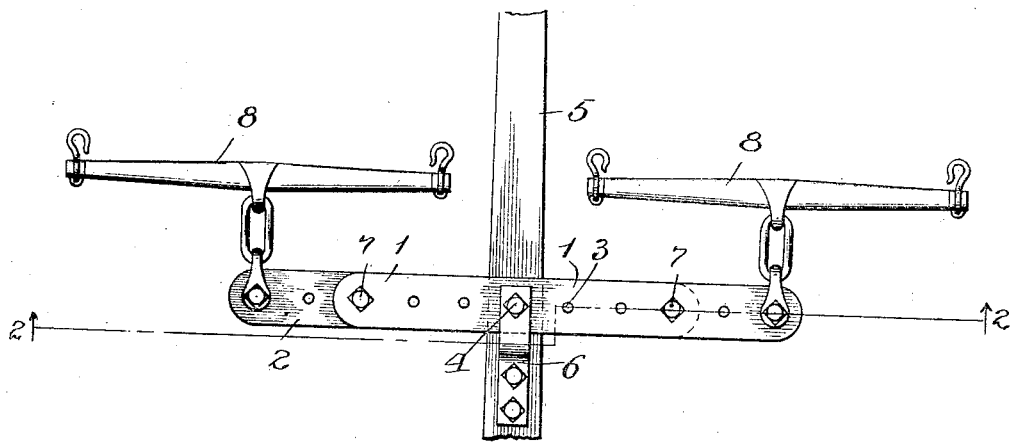
Figure 2:
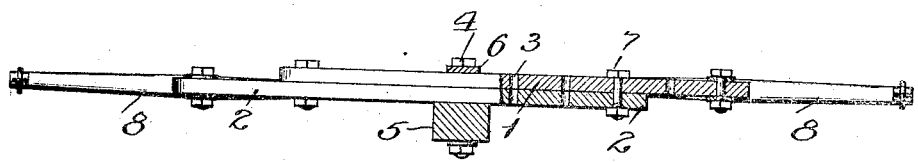

Figure 1 is a top plan partly broken away of a vehicle tongue provided with a draft equalizer constructed according to this invention. Fig. 2 is a section on the line 2—2 of Fig. 1.

In the construction shown, the equalizer tree consists of two bars 1 and 2, which overlap each other for a considerable part of their length and each of which is provided with a series of bolt holes 3. Said holes are preferably all of the same size so that the draw-bolt 4 may be inserted into any of them. The tongue 5 has bolted thereon a strap 6 which extends over the top of the tree and braces the bolt against bending.

The bars 1 and 2 are prevented from angular movement with respect to each other by the bolts 7, which pass through registering apertures in the bars at a distance from the draw-bolt. In the specific construction shown, all of the bolt holes 3 are of the same size and they are equally spaced in each of the bars so that in all positions of adjustment the holes in the overlapping parts of the bars will register with each other. This admits of a large number of adjustments of the length of the tree and also admits of adjusting the draw-bolt to a large number of positions along the tree so as to vary the respective lengths of the arms which are at opposite sides of the tongue. The whiffletrees 8 may be connected to the main tree in the usual manner and may also be adjusted to any of the holes 3.

The operation of the device shown will be readily understood from the drawings and the foregoing description.

What I claim as my invention and desire to secure by Letters Patent is

1. The combination with a tongue and its draw-bolt, of an equalizer tree comprising two parallel overlapping bars of equal transverse strength, each having therein a series of holes for receiving said draw-bolt, said bars being adjustable longitudinally of each other to bring different holes in each into registry with different holes in the other, said draw-bolt being adapted to be passed through registering holes in the two bars for attaching the tree to the tongue, and clamping means securing the inner, overlapping end of each bar to the adjacent part of the other bar for preventing said bars from swinging on said bolt independently of each other.

2. The combination with a tongue and draw-bolt, of an equalizer tree, comprising a pair of bars overlapping each other and each having therein a series of equally spaced bolt holes, the holes of each bar being spaced to register with those of the other, to permit the length of said tree to be adjusted and to permit the draw-bolt to be shifted to different holes for the purpose of equalizing the pull of draft animals of unequal power, and a second bolt extending through registering holes at a distance from the draw-bolt to prevent swinging of one bar relatively of the other.

3. The combination of a tongue, a tree for connecting a plurality of draft animals to said tongue and comprising a pair of bars overlapping each other and each provided with a series of equally spaced holes adapted to register with the holes in the other bar and permit of longitudinal adjustment of said bars upon each other, and a draw-bolt for pivotally connecting said tree and tongue, said bolt being shiftable to different holes for equalizing the draft of the animals at different sides of the tongue, and clamping means for securing the inner end of each bar to the adjacent part of the other to prevent relative movement of said bars with respect to each other.

4. In a draft equalizer, a tree for connecting a plurality of draft animals to a wagon tongue, comprising a pair of overlapping bars having therein a series of equally spaced bolt holes, all of said holes being of the same size and the holes in the adjacent parts of said bars being adapted to register with each other when said bars are adjusted longitudinally of each other to a plurality of different relative positions, a draw-bolt adapted to pass through any pair of such registering holes for connecting the tree to the tongue, and a pair of bolts adapted to be passed through other pairs of such registering holes for preventing said bars from swinging independently of each other on said draw-bolt, substantially as described.

Signed at Apache this 26 day of July 1907.

GEORGE MOSMEIER.

Witnesses:
　J. I. HENDRICKS,
　I. F. CRANY.